(12) United States Patent
Sasaki et al.

(10) Patent No.: US 9,580,136 B2
(45) Date of Patent: Feb. 28, 2017

(54) CORROSION RESISTANT BICYCLE DISC BRAKE ROTOR

(71) Applicant: SHIMANO INC., Sakai-shi, Osaka (JP)

(72) Inventors: Bungo Sasaki, Sakai (JP); Makoto Souwa, Sakai (JP); Toru Iwai, Sakai (JP)

(73) Assignee: Shimano Inc., Sakai-shi (JP)

( * ) Notice: Subject to any disclaimer, the term of this patent is extended or adjusted under 35 U.S.C. 154(b) by 0 days.

(21) Appl. No.: 14/629,419

(22) Filed: Feb. 23, 2015

(65) Prior Publication Data

US 2015/0166142 A1  Jun. 18, 2015

Related U.S. Application Data

(63) Continuation-in-part of application No. 13/352,868, filed on Jan. 18, 2012.

(51) Int. Cl.
| | |
|---|---|
| *F16D 65/12* | (2006.01) |
| *B62L 1/00* | (2006.01) |
| *F16D 65/853* | (2006.01) |
| *F16D 65/02* | (2006.01) |

(52) U.S. Cl.
CPC .............. *B62L 1/005* (2013.01); *F16D 65/12* (2013.01); *F16D 65/125* (2013.01); *F16D 65/127* (2013.01); *F16D 65/853* (2013.01); *F16D 2065/132* (2013.01); *F16D 2065/1316* (2013.01); *F16D 2200/003* (2013.01); *F16D 2200/0008* (2013.01); *F16D 2200/0017* (2013.01); *F16D 2250/0038* (2013.01)

(58) Field of Classification Search
CPC ...... F16D 55/00; F16D 65/0025; F16D 65/12; F16D 65/125; F16D 65/127; F16D 2200/00; F16D 2200/0004; F16D 2200/0008; F16D 2200/0013; F16D 2200/0017; F16D 2200/003; F16D 2250/0038; F16D 2250/0046; F16D 2250/0053
USPC ........................ 188/24.11, 26, 218 XL, 18 A
See application file for complete search history.

(56) References Cited

U.S. PATENT DOCUMENTS

| | | |
|---|---|---|
| 6,467,589 B2 | 10/2002 | Seymour |
| 7,416,060 B2 | 8/2008 | Takizawa |
| 7,424,938 B2 | 9/2008 | Takizawa |
| 2003/0010585 A1 | 1/2003 | Okada et al. |
| 2005/0006186 A1 | 1/2005 | Iwai et al. |
| 2005/0056495 A1 | 3/2005 | Greppi |

(Continued)

FOREIGN PATENT DOCUMENTS

| | | |
|---|---|---|
| CN | 102021511 A | 4/2011 |
| CN | 101098986 B | 8/2011 |

(Continued)

OTHER PUBLICATIONS

Ding, Q., "Mechanisms of Alumetizing of Steel," Corrosion & Protection, vol. 20, No. 11, Nov. 1999, 3 pages.

*Primary Examiner* — Robert A Siconolfi
*Assistant Examiner* — Vu Q Nguyen
(74) *Attorney, Agent, or Firm* — Alleman Hall McCoy Russell & Tuttle LLP

(57) ABSTRACT

A bicycle disc brake rotor, having a rotational center axis, comprises a base portion including iron and a surface portion including iron, aluminum, and chrome. The surface portion is formed on an external surface of the base portion. A concentration gradient of chrome of the surface portion is formed in an axial direction parallel to the rotational center axis.

16 Claims, 6 Drawing Sheets

(56) References Cited

U.S. PATENT DOCUMENTS

| | | |
|---|---|---|
| 2006/0272909 A1 | 12/2006 | Fuller et al. |
| 2008/0000550 A1 | 1/2008 | Holly et al. |
| 2008/0060891 A1 | 3/2008 | Chen et al. |
| 2011/0240420 A1 | 10/2011 | Souwa et al. |
| 2012/0000736 A1 | 1/2012 | Koshiyama |

FOREIGN PATENT DOCUMENTS

| | | |
|---|---|---|
| CN | 102308112 A | 1/2012 |
| DE | 1281223 B | 10/1968 |
| DE | 10342743 A1 | 4/2005 |
| DE | 102005008569 A1 | 10/2006 |
| DE | 102013100059 A1 | 7/2013 |
| DE | 212012000088 U1 | 11/2013 |
| DE | 60207937 T2 | 6/2014 |
| TW | 200904700 A | 2/2009 |

CORROSION RESISTANT BICYCLE DISC BRAKE ROTOR

CROSS-REFERENCE TO RELATED APPLICATION

The present application is a continuation-in-part of U.S. application Ser. No. 13/352,868, entitled BICYCLE DISC BRAKE ROTOR, filed Jan. 18, 2012, the disclosure of which is hereby incorporated by reference in its entirety for all purposes.

BACKGROUND

Disc brake systems are commonly incorporated into bicycles. Disc brake systems at least include a disc brake rotor. Several materials, such as aluminum, stainless steel, titanium, and iron, have been used for a bicycle disc brake rotor.

SUMMARY

According to a first aspect of the invention, the bicycle disc brake rotor device has a rotational center axis and may comprise a base portion including iron, and a surface portion that is formed on an external surface of the base portion. The surface portion, having a concentration gradient of chrome in an axial direction parallel to the rotational center axis, includes iron, aluminum, and chrome. One potential advantage of this configuration is that the corrosion resistance, wear resistance, and structural strength of the bicycle rotor are improved.

In the first aspect, a concentration of chrome is reduced from an outermost surface of the surface portion toward the base portion. One potential advantage of such a configuration is that the area of the disc brake rotor that comes into contact with the brake pads is preferentially formed to achieve the greatest corrosion resistance, wear resistance, and structural strength.

In the first aspect, the surface portion further includes a compounded material comprising iron and aluminum. One potential advantage of such a configuration is that the area of the disc brake rotor that comes into contact with the brake pads is preferentially formed to achieve the greatest corrosion resistance, wear resistance, and structural strength, with progressively less corrosion resistance, wear resistance, and structural strength with greater distance from the area of contact with the brake pads.

In the first aspect, the surface portion is formed by a diffusion process. One potential advantage of such a configuration is that the compounded iron, aluminum, and chrome alloy can be economically achieved in the surface portion of the disc brake rotor, so that the area of the disc brake rotor that comes into contact with the brake pads is preferentially formed to achieve the greatest corrosion resistance, wear resistance, and structural strength.

In the first aspect, the surface portion is quench hardened. One potential advantage of such a configuration is that the structural strength and wear resistance of the surface portion of the disc brake rotor can be improved.

In the first aspect, an outermost surface of the surface portion is formed by a grinding process. One potential advantage of such a configuration is that the disc brake rotor can achieve the desired thickness of the surface portion to fit the dimensions of the front disc brake system, while not excessively compromising the chrome and aluminum content of the surface portion.

In the first aspect, a thickness of the surface portion is greater than 10 μm. One potential advantage of such a configuration is that a sufficient concentration of chrome in the outermost surface of the surface portion can be achieved during the diffusion process to provide the desired corrosion resistance, wear resistance, and structural strength.

In the first aspect, a thickness of the surface portion is greater than 50 μm. One potential advantage of such a configuration is that a sufficient concentration of chrome in the outermost surface of the surface portion can be achieved during the diffusion process to provide the desired corrosion resistance, wear resistance, and structural strength.

In the first aspect, a thickness of the surface portion is greater than 70 μm. One potential advantage of such a configuration is that a sufficient concentration of chrome in the outermost surface of the surface portion can be achieved during the diffusion process to provide the desired corrosion resistance, wear resistance, and structural strength.

In the first aspect, a Vickers Hardness (Hv) of the surface portion is greater than or equal to 250. One potential advantage of such a configuration is that the quench hardened structural strength and wear resistance of the surface portion is achieved.

In the first aspect, the Vickers Hardness (Hv) of the surface portion is less than or equal to 1000. One potential advantage of such a configuration is that the quench hardened structural strength and wear resistance of the surface portion is achieved.

In the first aspect, the bicycle disc brake rotor device further comprises an outer member including the base portion and the surface portion, a hub attachment member configured to be mounted to a bicycle hub assembly of the bicycle, and at least one intermediate member connecting the outer member and the hub attachment member. One potential advantage of such a configuration is that a surface portion with improved corrosion resistance, wear resistance, and structural strength is applied to a bicycle disc brake rotor device that is coupled to the hub assembly of a bicycle as part of the braking system.

In the first aspect, at least one of the outer member and the at least one intermediate member include at least one through bore having a peripheral surface, and the peripheral surface entirely forms the surface portion. One potential advantage of such a configuration is that the improved corrosion resistance, wear resistance, and structural strength extend to all surface regions of the outer member, including the peripheral surfaces of the through bores.

In the first aspect, the at least one intermediate member is integral with the outer member. One potential advantage of such a configuration is that the number of manufacturing components may be reduced.

In the first aspect, the at least one intermediate member is integral with the hub attachment member. One potential advantage of such a configuration is that the number of manufacturing components may be reduced.

In the first aspect, the at least one intermediate member is integral with the outer member and the hub attachment member. One potential advantage of such a configuration is that the number of manufacturing components may be reduced.

In the second aspect, the at least one intermediate member is separate from the outer member. One potential advantage of such a configuration is that a surface portion with improved corrosion resistance, wear resistance, and structural strength is preferentially applied to the outer member, which is the part of the bicycle disc brake rotor device that comes into direct contact with the brake pads.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
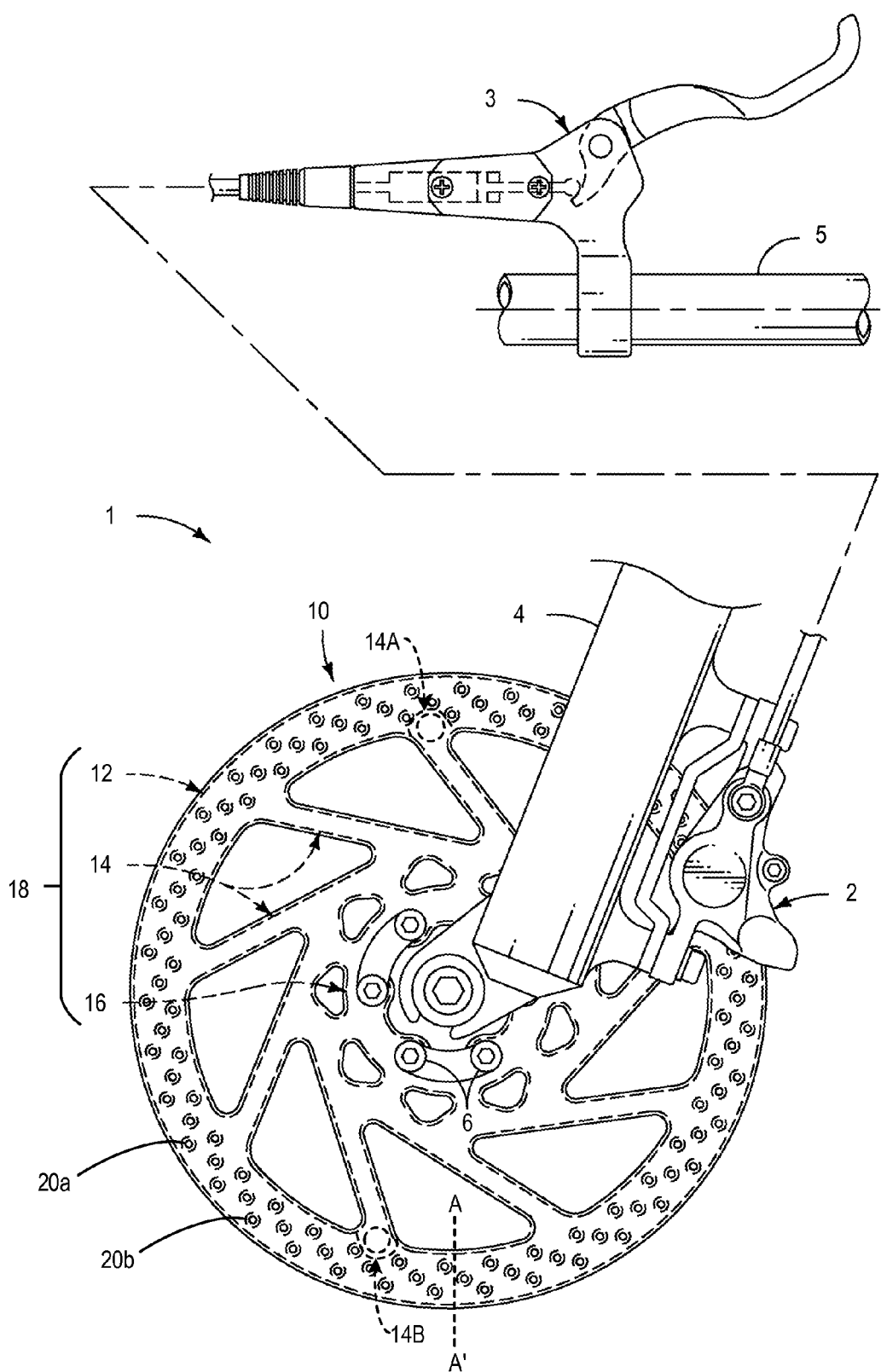
FIG. 1 illustrates a partial side elevational view of an exemplary bicycle disc brake rotor of a front disc brake system, according to one disclosed embodiment of the present invention.

Referring initially to FIG. 1, an exemplary bicycle disc brake rotor 10 of a front disc brake system 1 according to one disclosed embodiment of the present invention is shown. The front disc brake system 10 includes a bicycle disc brake caliper 2 and a brake operating (actuating) mechanism 3. The bicycle disc brake rotor 10 is fixedly attached to a bicycle hub of a bicycle wheel (not shown). The bicycle disc brake caliper 2 is mounted to a bicycle fork 4, while the brake operating mechanism 3 is attached to a bicycle handlebar 5. Except for the bicycle disc brake rotor 10, the operation and construction of the front disc brake system 1 is conventional and taught in prior art. Moreover, while the front disc brake system 1 is illustrated as a hydraulic braking system in this embodiment, it will be appreciated that the bicycle disc brake rotor 10 can be used with other types of braking systems as well.

The bicycle disc brake rotor 10 has a base rotor plate 18 that comprises an outer member 12 including a base portion and a surface portion (shown within cross-section A-A' in FIG. 3), at least one or more intermediate members 14 extending radially inward from the outer member 12 to connect the outer member 12 with a hub attachment member 16, and the hub attachment member 16 coupled to the inner ends of the intermediate members 14 by a plurality of fasteners 6 and configured to be mounted to a bicycle hub assembly of the bicycle (not shown). In this embodiment, the outer member 12, the intermediate members 14, and the hub attachment member 16 are integrally formed as a one-piece member of metal. However, in other embodiments, the outer member 12, the intermediate members 14, and the hub attachment member 16 may be separate pieces that are not integrally formed. For example, in some embodiments, at least one intermediate member 14 may be separate from the outer member 12, and the at least one intermediate member may be formed integrally with the hub attachment member. For example, as shown schematically at 14A, the intermediate members may be formed separately and later fastened to the outer member 12 by fasteners such as bolts. In such a configuration, the all of the intermediate members 14 are typically formed integrally with the hub attachment member 16, while being formed separately from the outer member; however, other configurations are possible such as alternating the integrally-formed and fastener-attached sides of the intermediate members around the circumference of the rotor. In other embodiments, at least one intermediate member 14 may be integral with the outer member 12, and the at least one intermediate member 14 may be formed separately and attached to the hub attachment member 16 by a fastener, as illustrated at 14B. Typically, in such a configuration, all of the intermediate members 14 are formed integrally with the outer member 12 and formed separately and fastened to the hub attachment member 16; however, as mentioned above, the integrally formed and fastener-attached sides of the intermediate members 14 may be alternated, for example. As described above in the depicted embodiment, it will be appreciated that at least one of, and typically all of intermediate members 14 are formed to be integral with both the outer member 12 and the hub attachment member 16. Further, at least one of the outer member 12 and at least one of the intermediate members 14 may include at least one through-bore 20. In the depicted embodiment, multiple through-bores 20 are shown to extend from a first side surface to a second side surface against which brake pads are pressed, and are distributed in substantially even density throughout the entire side surfaces of the outer member. These through-bores 20 serve both to help air-flow to distribute heat caused by friction from braking, as well as lighten the outer member.

Figure 2:
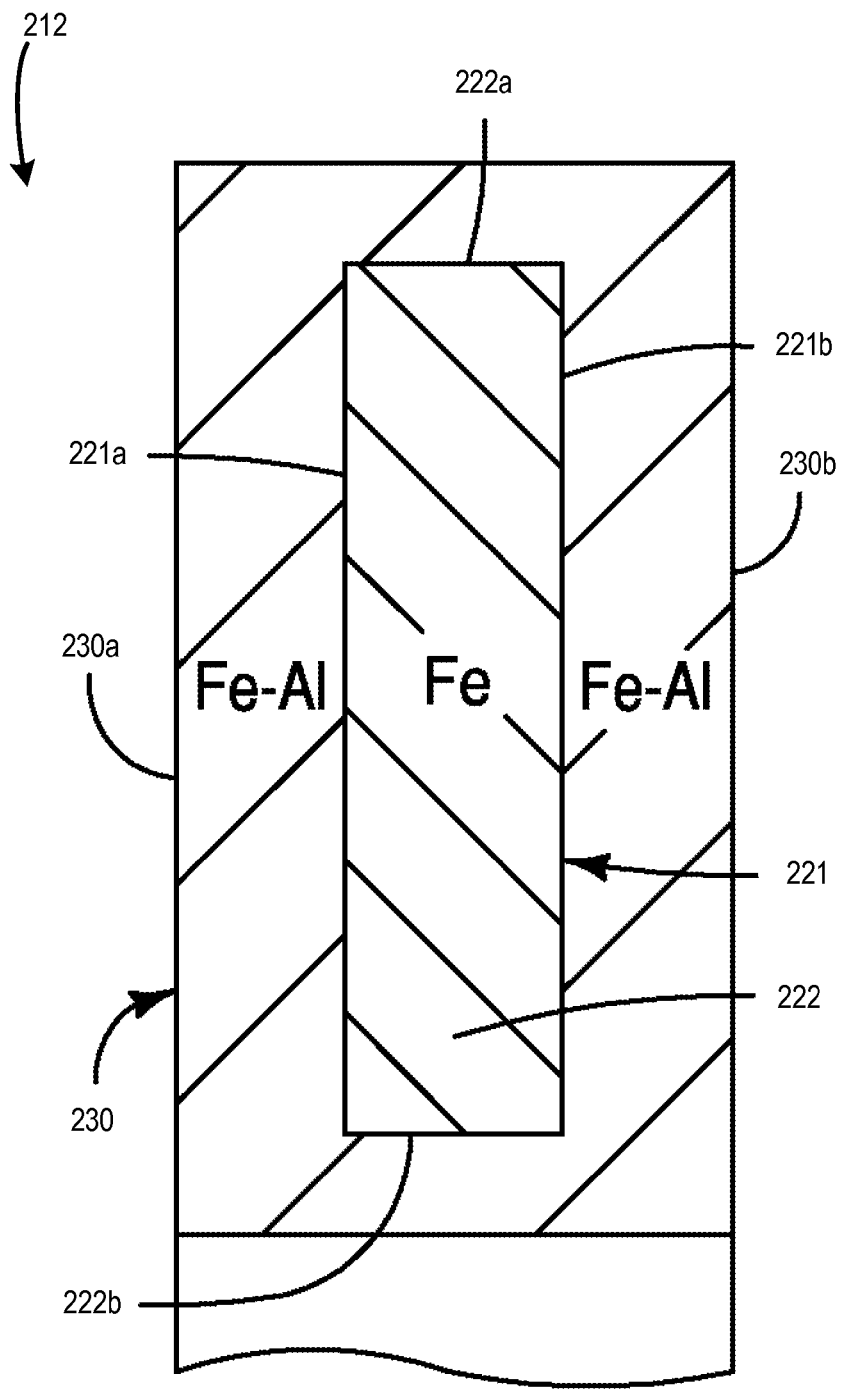
FIG. 2 illustrates an enlarged, partial cross sectional view of a portion of an exemplary conventional bicycle disc brake rotor.

FIG. 2 shows a partial cross-sectional view of a conventional exemplary bicycle disc brake rotor that would correspond to a cross-sectional view of the bicycle disc brake rotor taken along the dotted line A-A' in FIG. 1. The base portion 222 of the base rotor plate 221 has an outer peripheral edge 222a and an inner peripheral edge 222b. The intermediate members extend radially inward from the inner peripheral edge 222b of the base portion 222. The base rotor plate 221 has first and second base surfaces 221a and 221b that face in opposite axial directions of the bicycle disc brake rotor 212. The first and second base surfaces 221a and 221b are flat surfaces that extend over the base portion 222, the intermediate members, and the hub attachment members. The first and second surfaces 221a and 221b may not necessarily be flat in all areas. For example, the first and second base surfaces 221a and 221b can be contoured in the areas of the intermediate members and the hub attachment members.

In the prior art embodiment, the bicycle disc brake rotor 212 is chemically treated to further include a surface region 230 that forms a protective region on the base rotor plate 221 by a diffusion process. Typically, the surface region 230 is an alloy zone or layer with a uniform thickness that is chemically formed on all exposed surfaces of the base rotor plate 221. The thickness of the surface region 230 varies depending on the length of time in which the bicycle disc brake rotor 212 is subjected to the diffusion process. The compounded material is infiltrated into at least the first and second base surfaces 221a and 221b. Also using a diffusion process, at least one or both of the peripheral edges 222a and 222b of the base portion 222 can also have a diffusion zone. The diffusion zone of the surface region 230 may include an aluminum and iron compound in the prior art. In this example, aluminum diffuses through the iron to the first and second base surfaces 221a and 221b to form an alloy. The concentration gradient of the aluminum is reduced from the outer surfaces 230a and 230b toward the base portion 222, so that the concentration of the aluminum is greatest at the outer surfaces 230a and 230b, which directly contact the brake pads of the bicycle disc brake caliper. Thus, the diffusion zone of the surface region 230 overlying the base portion 222 of the base rotor plate 221 provides both structural strength and corrosion resistance for the bicycle disc brake rotor 212, especially in areas where the bicycle disc brake rotor 212 comes into contact with the brake pads of the bicycle disc brake caliper.

Figure 3:
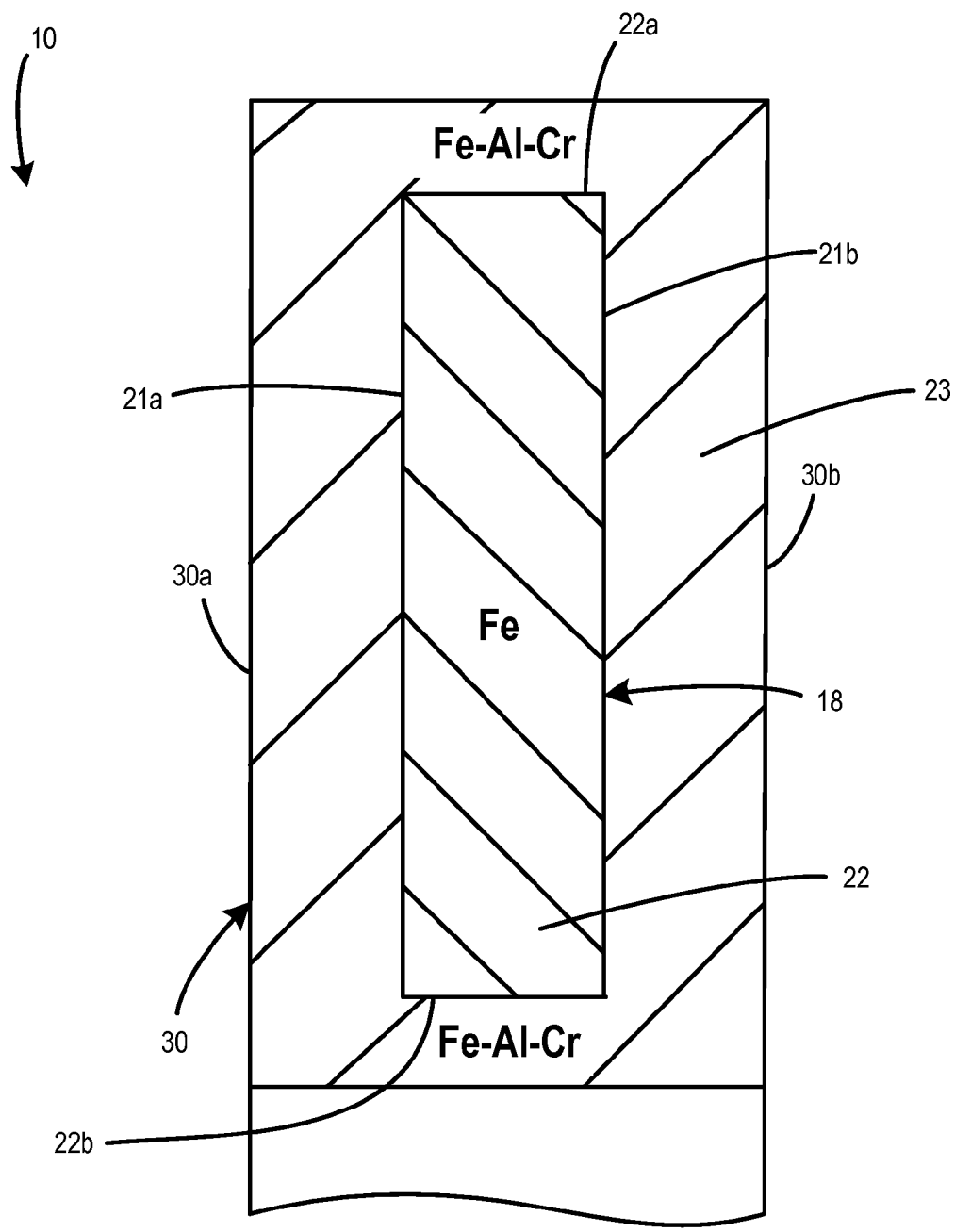
FIG. 3 illustrates an enlarged, partial cross sectional view of a portion of an exemplary bicycle disc brake rotor taken along line A-A' in FIG. 1, according to one disclosed embodiment of the present invention.

Referring to FIG. 3, an enlarged, partial cross sectional view of a portion of the outer member 12 of an exemplary bicycle disc brake rotor 10 is shown, taken along the dotted line A-A' in FIG. 1, according to one disclosed embodiment of the present invention. The bicycle disc brake rotor, having a rotational center axis, comprises a base portion 22 and a surface portion 23. The base portion 22 of the base rotor plate 18 includes iron and has an outer peripheral edge 22a and an inner peripheral edge 22b. The intermediate members extend radially inward from the inner peripheral edge 22b of the base portion 22. The base rotor plate 18 has first and second base surfaces 21a and 21b that face in opposite axial directions of the bicycle disc brake rotor 10. The first and second base surfaces 21a and 21b are flat surfaces that extend over the base portion 22, the intermediate members, and the hub attachment members. The first and second surfaces 21a and 21b may not necessarily be flat in all areas. For example, the first and second base surfaces 21a and 21b can be contoured in the areas of the intermediate members and the hub attachment members.

The bicycle disc brake rotor 10 is chemically treated to further include a surface portion 23 that forms a protective region on an external surface of the base portion 22 by a diffusion process. In some embodiments, the through-bores 20 may also have peripheral surfaces that entirely form a surface portion 23 that comprises a protective region on an external surface of the base portion 22 by a diffusion process. In the present embodiment, the surface portion 23 is an alloy zone or layer with uniform thickness that is chemically formed in all exposed surfaces of the base rotor plate 18. However, not limited to this embodiment, other embodiments may involve a surface portion 23 that is chemically formed only on limited areas of the exposed surfaces of the base rotor plate 18.

The surface portion 23 includes a concentration gradient and a diffusion zone having a compounded material comprising iron, aluminum, and chrome that is diffused and infiltrated into at least the first and second base surfaces 21a and 21b, following the concentration gradient of chrome and aluminum in an axial direction parallel to the rotational center axis of the bicycle disc brake rotor device 10. The concentration gradient of chrome is reduced from the outermost surfaces of the surface portion 23 toward the base portion, so that the highest concentration of chrome is achieved on the outermost surfaces, the first and second outer surfaces 30a and 30b, while the lowest concentration of chrome is achieved in the innermost parts of the surface portion. Since the first and second outer surfaces 30a and 30b achieve the highest concentration of chrome, structural strength and corrosion resistance are provided for the bicycle disc brake rotor 10, especially in areas where the bicycle disc brake rotor 10 comes into contact with the brake pads of the bicycle disc brake caliper.

At least one or both of the peripheral edges 22a and 22b of the base portion 22 can also have a diffusion zone. In this example, aluminum and chrome diffuse to the first and second base surfaces 21a and 21b to form an alloy. The claimed alloy consisting of iron, aluminum, and chrome is superior to one consisting of only iron and aluminum, since the claimed alloy, in conjunction with quench hardening, achieves an improved corrosion resistance, wear resistance, and structural strength, so that the Vickers Hardness (Hv) of the surface portion is greater or equal to 250, or less than or equal to 1000.

Figure 4:
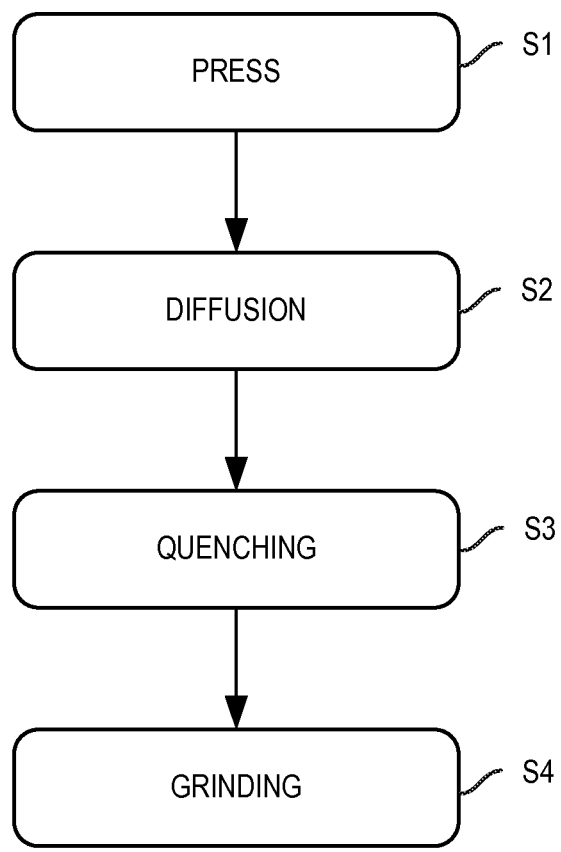
FIG. 4 is a flowchart illustrating the manufacturing steps for forming a bicycle disc brake rotor of an embodiment of the present invention.

Referring to FIG. 4, the manufacturing steps of forming a bicycle disc brake rotor of an embodiment of the present invention are demonstrated. The manufacturing the bicycle disc brake rotor involves four steps: (S1) Press, (S2) Diffusion, (S3) Quenching, and (S4) Grinding. At step S1, the disc brake rotor is formed by a press process, when the iron base material is stamped into a desired shape that corresponds to the outer member. Since corrosion resistance can be affected by the porosity, hardness, and the surface finish of the base substrate, care is taken to press an iron base material that is free of cracks, pores, and discontinuities.

At step S2, the surface portion is formed by a diffusion process. In the diffusion process, chrome and aluminum are diffused into the iron base material by heating at approximately 900-1000° C. in media (solid, liquid, or gaseous) that is rich in chrome and aluminum, achieving hardness, structural strength, wear resistance, and corrosion resistance. The thickness of the surface portion is controlled by regulating the diffusion time and temperature of the media during the diffusion process. The temperature of the media is kept within the above range, as exceeding the upper temperature limit may compromise the subsequent quench hardening process.

At step S3, the surface portion of the disc brake rotor is quench hardened. In the quench hardening process, the heated metal is rapidly cooled, preventing the formation of all crystalline structures, resulting in an amorphous metal that is structurally strong and resistant to shattering, achieving a high degree of toughness and ductility. Successful treatment requires that the heated metal be cooled immediately after the diffusion process is completed, and quenched at the highest possible rate. Various quenching media, such as water, oil, polymers, or forced air, may be utilized in implementing a successful treatment. Care is taken to control the quenching treatment so that internal stresses do not form within the cooled metal. In some embodiments, the manufacturing process for the disc brake rotor may skip the quench hardening process to reduce manufacturing time and costs. In other embodiments, the disc brake rotor may undergo the diffusion process and quench hardening twice to carry out tempering.

At step S4, the outermost surface of the surface portion is formed by a grinding process. The grinding process, a strictly optional step, achieves the desired thickness of the surface portion by grinding away parts of the surface portion, beginning with the surface, to fit the dimensions of the disc brake system, while not excessively compromising the chrome and aluminum content of the surface portion. The thickness of the surface portion may be preferably greater than 10 µm in some embodiments, more preferably greater than 50 µm, and most preferably greater than 70 µm. In other embodiments, the manufacturing process may be calibrated in such a way that a grinding process is not necessary to adjust the dimensions of the bicycle disc rotor to fit the disc brake system.

Figure 5A:
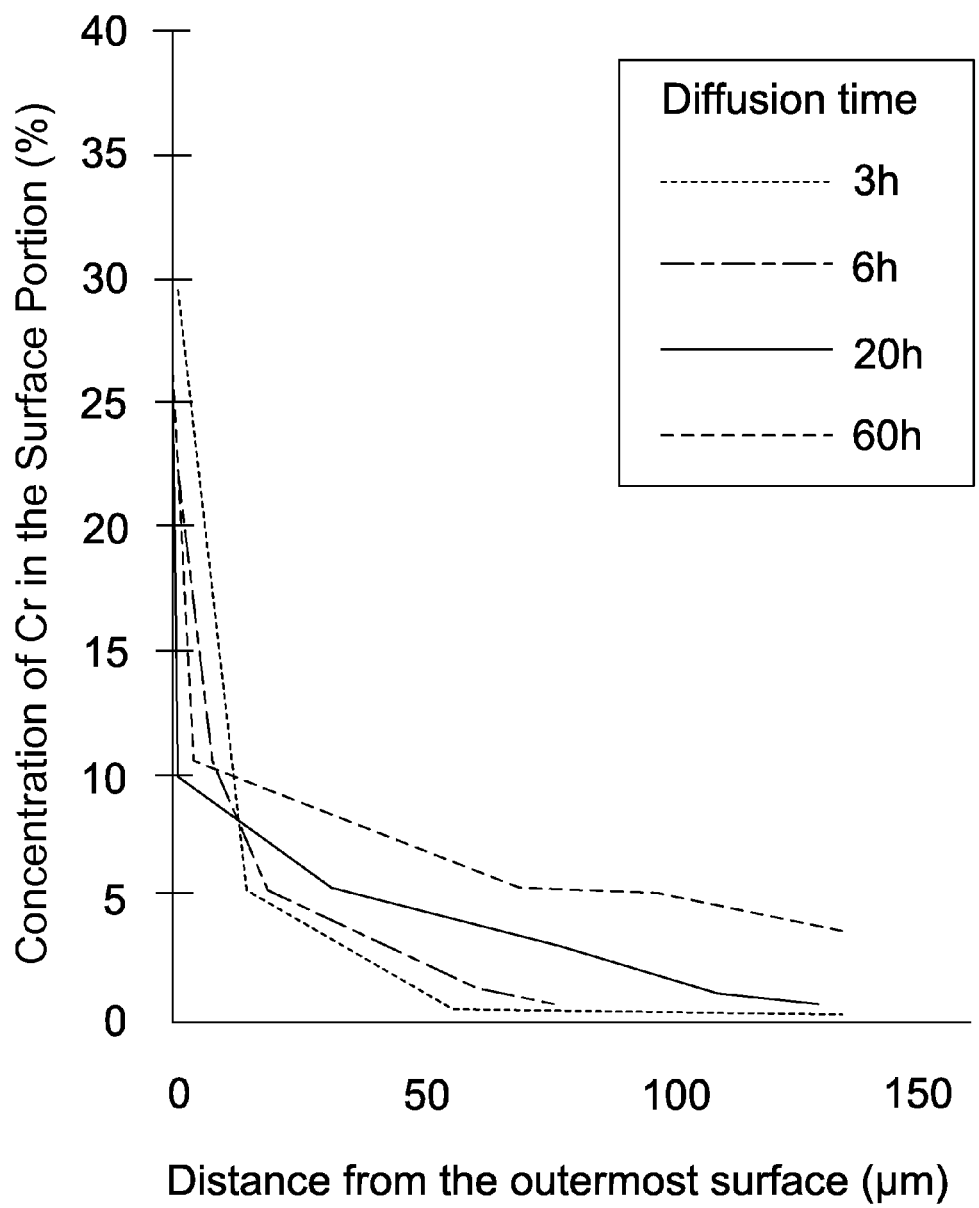
FIG. 5A is a plot illustrating the relationship at approximately 900° C. between the concentration of chrome in the surface portion at any given point, its distance from the outermost surface, and the amount of time of the diffusion process is depicted for cases when the iron base material is heated at 900° C. in media that is rich in chrome and aluminum.

As shown in FIG. 5A, the concentration of chrome in the surface portion at any given point is dependent on its distance from the outermost surface. Here, the relationship at approximately 900° C. between the concentration of chrome in the surface portion at any given point, its distance from the outermost surface, and the amount of time of the diffusion process is depicted for cases when the iron base material is heated at 900° C. in media (solid, liquid, or gaseous) that is rich in chrome and aluminum. For each diffusion curve, concentration of chrome in the surface portion drops off with increasing distance from the outermost surface. Increased diffusion times allow more time for the chrome and aluminum to diffuse through the surface portion, increasing the concentration of chrome throughout the entire surface portion and allowing the chrome and aluminum to penetrate deeper into the iron base material, also increasing the thickness of the surface portion in the process. However, excessive diffusion times could lead to an excessively low concentration of iron in the outermost surface of the surface portion, leading the surface portion to lose some properties that the iron base material provides, such as superior heat dissipation. Thus, the diffusion process should ideally achieve a balance in the final proportions of iron, chrome, and aluminum in the surface portion.

Figure 5B:
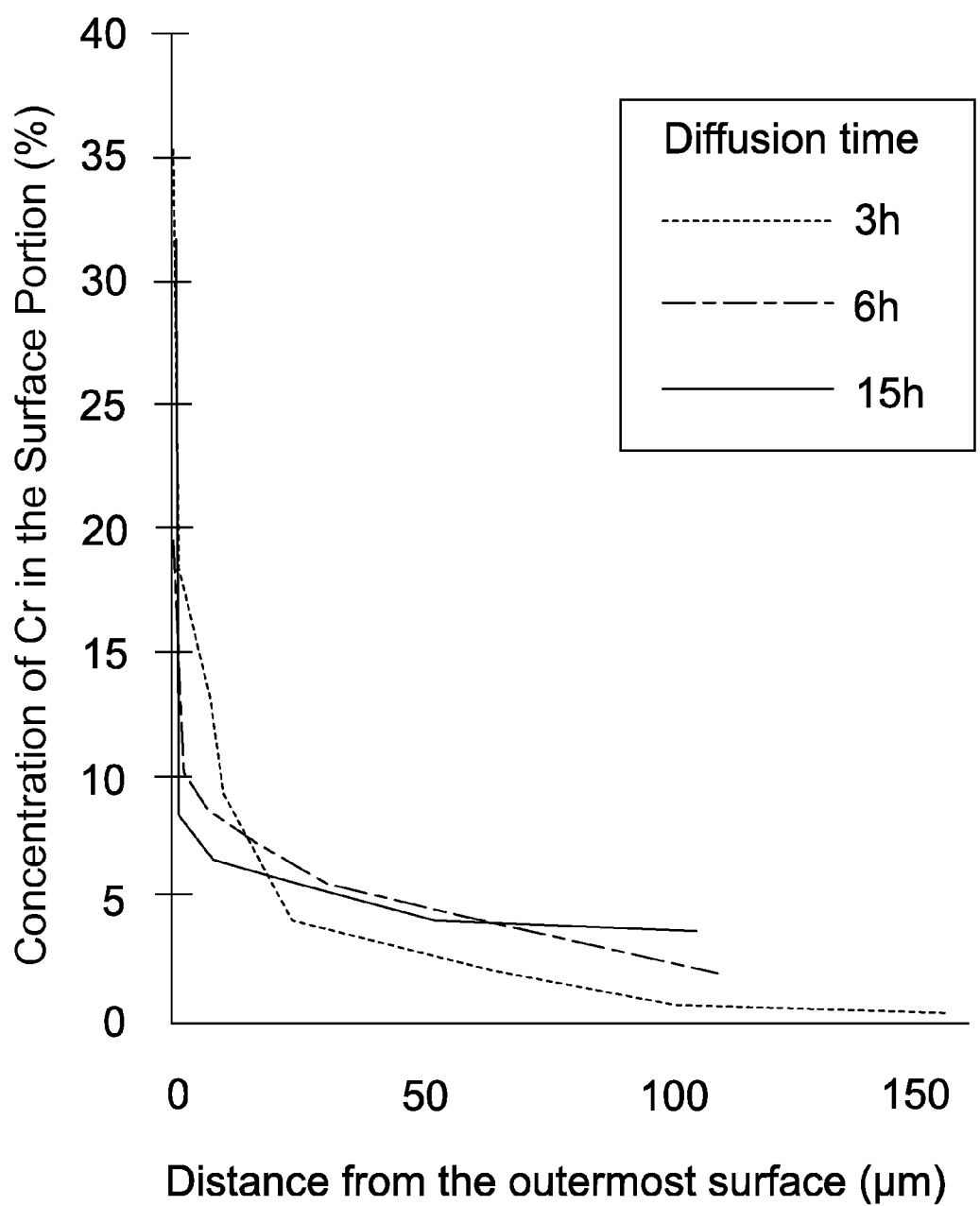
FIG. 5B is a plot illustrating the relationship at approximately 1000° C. between the concentration of chrome in the surface portion at any given point, its distance from the outermost surface, and the amount of time of the diffusion process is depicted for cases when the iron base material is heated at 1000° C. in media that is rich in chrome and aluminum.

As shown in FIG. 5B, the concentration of chrome in the surface portion at any given point is dependent on its distance from the outermost surface. Here, the relationship at approximately 1000° C. between the concentration of chrome in the surface portion at any given point, its distance from the outermost surface, and the amount of time of the diffusion process is depicted for cases when the iron base material is heated at 1000° C. in media (solid, liquid, or gaseous) that is rich in chrome and aluminum. Comparisons between FIGS. 5A and 5B suggest that preferably heating the iron base material to 1000° C., rather than 900° C., improves the chrome concentration throughout the entire surface portion. The diffusion curves also appear to drop off less steeply than those for cases when the iron base material is heated at 900° C. in media that is rich in chrome and aluminum. Thus, the data suggests that conducting the diffusion process at 1000° C., rather than 900° C., results in chrome concentrations that are more consistent near the outermost surface. This is especially advantageous when the outermost surface undergoes a grinding process to achieve a desired thickness of the surface portion to fit the dimensions of the disc brake system.

The above embodiments improve corrosion resistance of a bicycle rotor consisting of iron by adding chrome to the outer surface of the cycle disc brake rotor besides aluminum. As a further advantage according to the embodiment of the present invention, the structural strength and hardness of the outer surface of the bicycle disc brake rotor are enhanced. As a result, antiwear property is improved.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

The terms of degree such as "approximately" as used herein mean a reasonable amount of deviation of the modified term such that the end result is not significantly changed (e.g., manufacturing tolerances).

While specific embodiments of the bicycle disc brake rotor have been described in detail, the particular arrangements disclosed are meant to be illustrative only and not limiting. The features of the various embodiments described above, as well as modifications thereof, may be variously combined without departing from the scope of this disclosure.

The invention claimed is:

1. A bicycle disc brake rotor device having a rotational center axis, the bicycle disc brake rotor device comprising:
   a base portion including iron;
   a surface portion formed on an external surface of the base portion, the surface portion including iron, aluminum, and chromium, the surface portion having a concentration gradient of chromium in an axial direction parallel to the rotational center axis; and
   a hub attachment member configured to be mounted to a bicycle hub assembly of a bicycle, wherein
   the surface portion is formed by a diffusion process, and
   the diffusion process comprises heating the base portion to 1000° C. in chromium and aluminum media, such that the surface portion exhibits a structural characteristic of diffusion hardened chromium-iron-aluminum alloy with the concentration gradient of chromium.

2. The bicycle disc brake rotor device according to claim 1, wherein
   a concentration of chromium is reduced from an outermost surface of the surface portion toward the base portion.

3. The bicycle disc brake rotor device according to claim 1, wherein
   the surface portion further includes a compounded material comprising iron and aluminum, and an innermost part of the surface portion substantially lacks chromium.

4. The bicycle disc brake rotor device according to claim 3, wherein the surface portion is quench hardened.

5. The bicycle disc brake rotor device according to claim 1, wherein an outermost surface of the surface portion is formed by a grinding process.

6. The bicycle disc brake rotor device according to claim 1, wherein a thickness of the surface portion is greater than 10 µm.

7. The bicycle disc brake rotor device according to claim 1, wherein a thickness of the surface portion is greater than 50 μm.

8. The bicycle disc brake rotor device according to claim 1, wherein a thickness of the surface portion is greater than 70 μm.

9. The bicycle disc brake rotor device according to claim 1, wherein a Vickers Hardness (Hv) of the surface portion is greater than or equal to 250.

10. The bicycle disc brake rotor device according to claim 1, wherein the Vickers Hardness (Hv) of the surface portion is less than or equal to 1000.

11. The bicycle disc brake rotor device according to claim 1, further comprising:
    an outer member including the base portion and the surface portion; and
    at least one intermediate member connecting the outer member and the hub attachment member.

12. The bicycle disc brake rotor device according to claim 11, wherein
    at least one of the outer member and the at least one intermediate member include at least one through bore having a peripheral surface, and the peripheral surface entirely forms the surface portion.

13. The bicycle disc brake rotor device according to claim 11, wherein
    the at least one intermediate member is integral with the outer member.

14. The bicycle disc brake rotor device according to claim 11, wherein
    the at least one intermediate member is integral with the hub attachment member.

15. The bicycle disc brake rotor device according to claim 11, wherein
    the at least one intermediate member is integral with the outer member and the hub attachment member.

16. The bicycle disc brake rotor device according to claim 11, wherein
    the at least one intermediate member is separate from the outer member.

* * * * *